United States Patent
Sata et al.

(10) Patent No.: US 8,161,941 B2
(45) Date of Patent: Apr. 24, 2012

(54) CONTROL DEVICE FOR INTERNAL COMBUSTION ENGINE

(75) Inventors: Kota Sata, Susono (JP); Koichi Ueda, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 365 days.

(21) Appl. No.: 12/525,891

(22) PCT Filed: Feb. 5, 2008

(86) PCT No.: PCT/JP2008/052208
§ 371 (c)(1),
(2), (4) Date: Aug. 5, 2009

(87) PCT Pub. No.: WO2008/096885
PCT Pub. Date: Aug. 14, 2008

(65) Prior Publication Data
US 2010/0319659 A1 Dec. 23, 2010

(30) Foreign Application Priority Data
Feb. 5, 2007 (JP) ................................. 2007-025908

(51) Int. Cl.
*F02P 5/15* (2006.01)
*F01N 3/10* (2006.01)
(52) U.S. Cl. ......... 123/406.54; 123/339.11; 123/406.55; 60/285
(58) Field of Classification Search .......... 701/102–105, 701/110, 113, 115; 123/179.5, 329, 339.11, 123/339.19, 406.23–406.25, 406.32, 406.35, 123/406.53, 406.54, 406.59, 406.64, 406.65, 123/406.55; 60/285
See application file for complete search history.

(56) References Cited

U.S. PATENT DOCUMENTS

| | | | | |
|---|---|---|---|---|
| 4,466,405 A | * | 8/1984 | Hattori et al. | 123/406.42 |
| 4,899,711 A | * | 2/1990 | Tabara et al. | 123/406.38 |
| 5,097,809 A | * | 3/1992 | Sekozawa et al. | 123/406.19 |
| 5,660,157 A | * | 8/1997 | Minowa et al. | 123/344 |
| 5,752,485 A | * | 5/1998 | Minowa et al. | 123/399 |
| 7,444,233 B2 | * | 10/2008 | Takatsuto et al. | 701/114 |
| 2001/0007191 A1 | * | 7/2001 | Ohuchi et al. | 60/284 |
| 2001/0010149 A1 | | 8/2001 | Ishii et al. | |

(Continued)

FOREIGN PATENT DOCUMENTS

| | | |
|---|---|---|
| EP | 1 595 733 A2 | 11/2005 |
| JP | 2001-90581 | 4/2001 |
| JP | 2001 214732 | 8/2001 |
| JP | 2003 254141 | 9/2003 |

(Continued)

*Primary Examiner* — Willis Wolfe, Jr.
*Assistant Examiner* — Johnny Hoang
(74) *Attorney, Agent, or Firm* — Oblon, Spivak, McClelland, Maier & Neustadt, L.L.P.

(57) ABSTRACT

A control device for an internal combustion engine which, at cold starting, enables an ignition timing retard control for warm-up of a catalyst device and a speed feedback control by means of ignition timing for converging an engine speed to a target speed includes a function for comparing a final ignition timing with a retard lower limit value, and a function for changing the target speed based upon the result of the comparing. When the final ignition timing reaches the retard lower limit value, the target speed is increased by a predetermined speed and when a difference between the final ignition timing and the retard lower limit value exceeds a predetermined angle on an advance side, the target speed is decreased by a predetermined speed. In this way, at cold starting, the engine speed is early converged to the target speed while restricting rotational variations and early warm-up of a catalyst device can be certainly realized.

5 Claims, 7 Drawing Sheets

U.S. PATENT DOCUMENTS

| | | | |
|---|---|---|---|
| 2002/0066436 A1* | 6/2002 | Majima et al. | 123/406.47 |
| 2003/0010317 A1* | 1/2003 | Iida et al. | 123/406.47 |
| 2005/0266957 A1 | 12/2005 | Kamijo et al. | |
| 2006/0122765 A1* | 6/2006 | Nakao et al. | 701/111 |
| 2007/0012285 A1* | 1/2007 | Yagihashi et al. | 123/339.14 |
| 2008/0154485 A1* | 6/2008 | Yasuda et al. | 701/113 |

FOREIGN PATENT DOCUMENTS

| | | |
|---|---|---|
| JP | 2005 214072 | 8/2005 |
| JP | 2005 344656 | 12/2005 |
| JP | 2005 351259 | 12/2005 |
| JP | 2006 132543 | 5/2006 |

* cited by examiner

CONTROL DEVICE FOR INTERNAL COMBUSTION ENGINE

TECHNICAL FIELD

The present invention relates to a control device for an internal combustion engine, and more particularly to a control device for an internal combustion engine which appropriately controls an engine speed at cold starting.

BACKGROUND ART

In general, it is preferable that a catalyst device provided in an engine exhaust system is early warmed up at cold starting to be capable of purifying an exhaust gas at an early stage after engine starting. Therefore, there is known a technology of retarding an ignition timing from a usual ignition timing to increase an exhaust gas temperature.

There is also known an internal combustion engine in which, for maintaining an engine speed at a predetermined target idle-speed at cold starting, an intake air quantity or ignition timing is feedback-controlled (for example, refer to Patent Documents 1 to 4).

The internal combustion engine described in Patent Document 1 (Japanese Patent Application Laid-Open No. 2006-132543) is designed to perform either an intake quantity speed control for controlling an engine speed to a target idle-speed by adjusting an electronic throttle opening in accordance with the speed at engine starting or an ignition timing speed control for controlling the engine speed to the target idle-speed by adjusting engine ignition timing.

In addition, the internal combustion engine described in Patent Document 2 (Japanese Patent Application Laid-Open No. 2005-214072) is designed such that, in a control device of the internal combustion engine for converging an engine speed quickly increasing up at engine starting to a target speed by a feedback retard control of ignition timing, when an ignition timing at the time the engine speed is converged to the target speed is on a side more advanced from a target ignition timing, the ignition timing is retarded to the target ignition timing and an intake air quantity is increased.

Further, the internal combustion engine described in Patent Document 3 (Japanese Patent Application Laid-Open No. 2005-344656) is designed such that, in a control device of the internal combustion engine for converging an engine speed to a target idle-speed by a speed feedback control by means of ignition timing to an intake air quantity increased at engine starting, when a feedback correction quantity in the feedback control becomes stable, for controlling the ignition timing to a target ignition timing, correction of the intake air quantity is made in accordance with the feedback correction quantity at this point to continuously perform the feedback control.

In addition, the internal combustion engine described in Patent Document 4 (Japanese Patent Application Laid-Open No. 2003-254141) is designed such that, in a control device of the internal combustion engine for converging an engine speed to a target speed by a speed feedback control by means of ignition timing at engine starting, when the ignition timing reaches to a retard critical value, an intake air quantity is controlled to converge the engine speed to the target speed.

DISCLOSURE OF THE INVENTION

In a case of the engine speed control by the speed feedback control by means of the aforementioned ignition timing, a feedback correction quantity of the ignition timing is found, for example, by a proportional integral-differential control based upon a deviation between the engine target speed and an actual engine speed. This feedback correction quantity is added to or subtracted from a basic ignition timing based upon an engine operating condition to set the final ignition timing. In a case where an ignition timing retard control is needed for early warm-up of a catalyst device, a catalyst warm-up retard quantity is further added to set the final ignition timing.

However, when the ignition timing retard control is performed for early warm-up of the catalyst device, the ignition timing results in being close to a retard lower limit value of the ignition timing that is set for reducing torque variations due to combustion deterioration of the engine. At this time, the actual engine speed may differ caused by engine structural variations or an engine friction due to viscosity of engine oil in use. That is, when the friction is small, the engine speed becomes higher than the target speed and on the other hand, when the friction is large, the engine speed becomes lower than the target speed.

When this engine speed is higher than the target speed, it is required to retard the ignition timing by the speed feedback control by means of ignition timing. In this case, since the ignition timing immediately reaches the retard lower limit value, the ignition timing is out of a range of the speed feedback control by means of ignition timing. Therefore, the engine speed control can not be performed, thereby raising a problem with occurrence in rotational variations. In addition, when the engine speed is lower than the target speed, the ignition timing is advanced by the speed feedback control by means of ignition timing. Therefore, such rotational variations are restricted, but the ignition timing is to a side more advanced than intended, and therefore, an exhaust gas temperature can not be sufficiently increased. In consequence, it leads to the problem with the difficulty in realizing early warm-up of the catalyst device.

Therefore, an object of the present invention is to provide a control device for an internal combustion engine which, at cold starting, can early converge an engine speed to a target speed while restricting rotation variations, and can certainly realize early warm-up of a catalyst device.

According to an aspect of a control device for an internal combustion engine in the present invention, a control device for an internal combustion engine which, at cold starting, enables an ignition timing retard control for warm-up of a catalyst device and a speed feedback control by means of ignition timing for converging an engine speed to a target speed comprises comparing means for comparing a final ignition timing with a retard lower limit value in the middle of performing the speed feedback control by means of ignition timing, and target speed changing means for changing the target speed in the speed feedback control by means of ignition timing based upon the result of the comparing by the comparing means.

Here, according to a first embodiment in the control device for the internal combustion engine, the control device for the internal combustion engine as described above is characterized in that when the final ignition timing reaches the retard lower limit value as a result of the comparing by the comparing means, the target speed is increased by a predetermined speed by the target speed changing means.

In addition, according to a second embodiment in the control device for the internal combustion engine, the control device for the internal combustion engine as described above is characterized in that when a difference between the final ignition timing and the retard lower limit value exceeds a predetermined angle on an advance side as a result of the comparing by the comparing means, the target speed is decreased by a predetermined speed by the target speed changing means.

Further, according to a third embodiment in the control device for the internal combustion engine, the control device for the internal combustion engine as described above is characterized in that when a changing quantity of the target speed by the target speed changing means is set in accordance with a difference magnitude between the final ignition timing and the retard lower limit value as a result of the comparing of the comparing means and a magnitude of a feedback integral quantity in the speed feedback control by means of ignition timing for preventing excessive correction.

It should be noted that in the control device for the internal combustion engine as described above, when the difference between the final ignition timing and the retard lower limit value is smaller than a speed feedback control allowance quantity by a predetermined ignition timing, the target speed may be increased by a difference between the target speed and an actual speed by the target speed changing means and the feedback integral quantity in the speed feedback control by means of ignition timing may be set to a zero.

According to the aspect of the control device for the internal combustion engine in the present invention, the final ignition timing is compared with the retard lower limit value by the comparing means in the middle of performing the speed feedback control by means of ignition timing at cold starting, and the target speed in the speed feedback control by means of ignition timing is changed by the target speed changing means based upon the result of the comparing by the comparing means. In consequence, the engine speed is early converged to the target speed while restricting the rotation variations and the early warm-up of the catalyst device can be certainly realized.

In addition, according to the first embodiment in the control device for the internal combustion engine in the present invention, when the final ignition timing reaches the retard lower limit value as a result of the comparing by the comparing means, the target speed is increased by the predetermined speed by the target speed changing means, the ignition timing is advanced in response to the increase of the target speed to be back to the range of the speed feedback control by means of ignition timing. Therefore, it is possible to perform the engine speed control by the speed feedback control by means of ignition timing to restrict the rotation variations. In addition, since an intake air quantity for obtaining necessary torque is secured, it is possible to maintain early warm-up characteristics of the catalyst device.

Further, according to the second embodiment in the control device for the internal combustion engine, when the difference between the final ignition timing and the retard lower limit value exceeds the predetermined angle on an advance side as a result of the comparing by the comparing means, the target speed is decreased by the predetermined speed by the target speed changing means. Therefore, the ignition timing is retarded in response to the reduction of the target speed. Since the exhaust gas temperature can be thus increased, it is possible to realize early warm-up of the catalyst device.

In addition, according to the third embodiment in the control device for the internal combustion engine, when the changing quantity of the target speed by the target speed changing means is set in accordance with the difference magnitude between the final ignition timing and the retard lower limit value as a result of the comparing by the comparing means and the magnitude of the feedback integral quantity in the speed feedback control by means of ignition timing for preventing the excessive correction. Therefore, convergence to the target speed is quickly made without occurrence of control hunting.

BEST MODE OF CARRYING OUT THE INVENTION

Hereinafter, embodiments in the present invention will be explained with reference to accompanying drawings.

Figure 1:
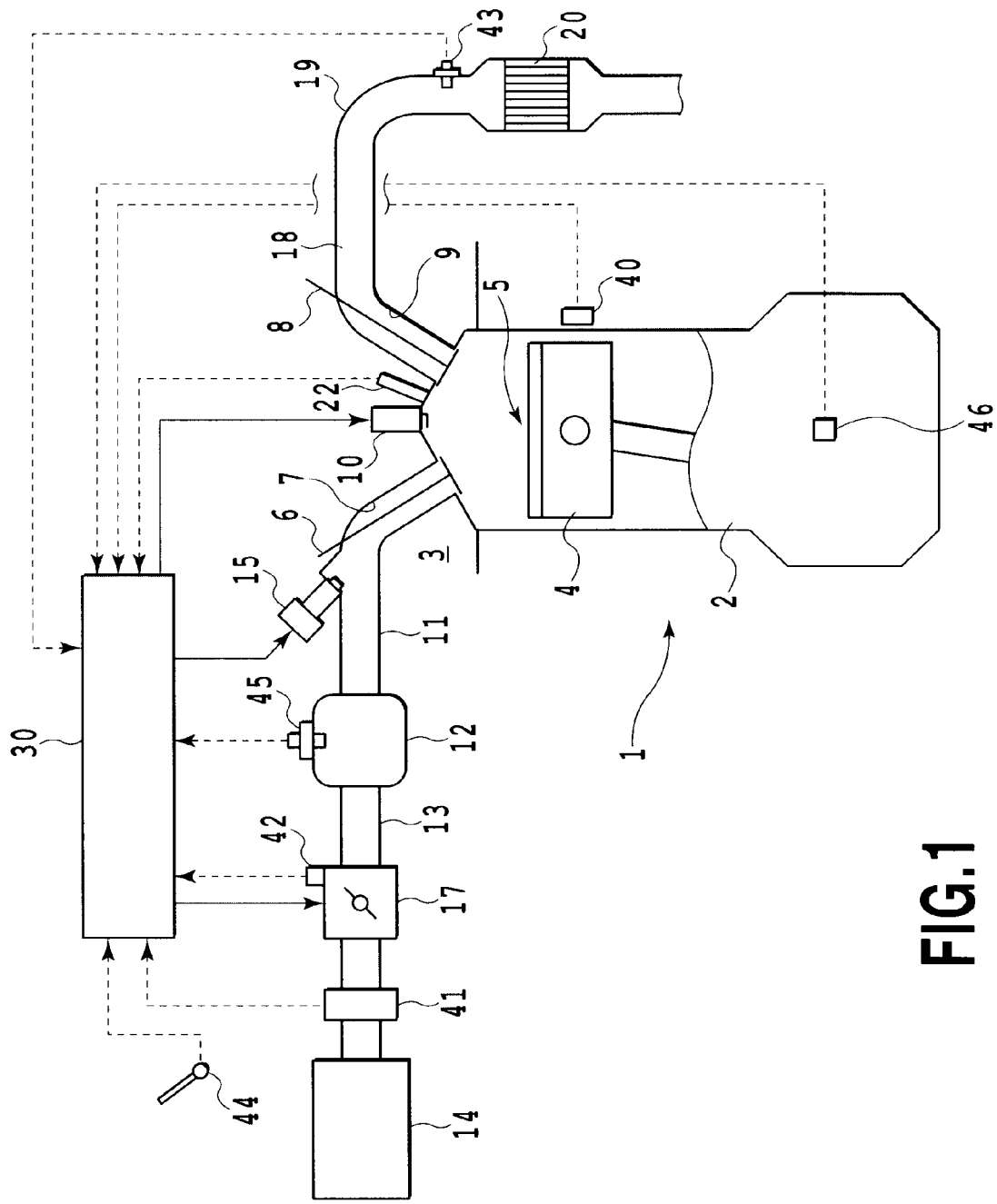
FIG. 1 is a system construction diagram showing a control device for an internal combustion engine according to the present invention.

Here, FIG. 1 is a schematic diagram showing an internal combustion engine in which a control device according to the present invention is mounted. In this figure, numerals 1 to 10 respectively designate an engine body having, for example, four cylinders, a cylinder block, a cylinder head, a piston, a combustion chamber, an intake valve, an intake port, an exhaust valve, an exhaust port, and an ignition plug. The intake port 7 is connected through an intake branch pipe 11 to a surge tank 12 and the surge tank 12 is connected through an intake duct 13 to an air cleaner 14. A fuel injector 15 is arranged in the intake branch pipe 11 and a so-called electronically controlled throttle valve 17 driven by a step motor or the like is arranged in the intake duct 13.

On the other hand, the exhaust port 9 is connected through an exhaust manifold 18 and an exhaust pipe 19 to a catalyst device 20. The catalyst device 20 is, for example, a three-way catalyst in a case of the internal combustion engine performing combustion in a stoichiometric air-fuel ratio as in the case of the present embodiment, and is, for example, a NOx absorption reduction catalyst in a case of an internal combustion engine of being capable of performing a stratified combustion in a lean air-fuel ratio as in the case of an in-cylinder injection type of spark ignition internal combustion engine having a fuel injector for injecting fuel directly into a cylinder. In any of the catalyst devices 20, it is required to increase the carried catalyst to more than an activation temperature for purifying the exhaust gas, and early warm-up of the catalyst device is desirable for purifying the exhaust gas early after starting at engine starting. Numeral 30 designates an electronically controlled unit (hereinafter, called ECU) constructed of a digital computer, which is provided with a ROM (read only memory), a RAM (random access memory) and a CPU (microprocessor) connected with each other through an interactive bus, a B-RAM (backup RAM) regularly connected to a power source, an input port, an output port and the like. In the ECU 30, an output voltage of each of a water temperature sensor 40 for detecting a cooling water temperature THW of an engine body 1, an air flow meter 41 disposed to the intake duct 13 for detecting an intake air mass flow quantity (hereinafter, referred to as intake air quantity), a throttle opening degree sensor 42 for detecting an opening degree of the throttle valve 17, an air-fuel ratio sensor 43 disposed to the exhaust pipe 21, an accelerator opening sensor 44 for detecting a depressing amount of an accelerator pedal, an intake pressure sensor 45 for detecting an intake pressure, and the like is inputted to the input port through an A/D converter corresponding to each element. Further, a crank angle sensor (hereinafter, referred to as speed sensor) 46 generating an output pulse every predetermined rotation angle of a crank shaft is connected to the input port. The ECU 30 calculates an engine speed NE based upon the output pulse.

An ignition switch is further connected to the input port and generates a signal showing that the ignition switch is ON. On the other hand, an output port is connected to each of the ignition plug 10, the fuel injector 15 and an actuator of the electronically controlled throttle valve 17 through a drive circuit corresponding to each aforementioned element.

Hereinafter, an engine starting control performed by the control device according to the present invention will be explained with reference to the accompanying flow chart. This engine starting control starts at the time when at engine starting, a complete combustion of each cylinder is attained and an engine speed exceeds a target speed at idle.

Figure 2:
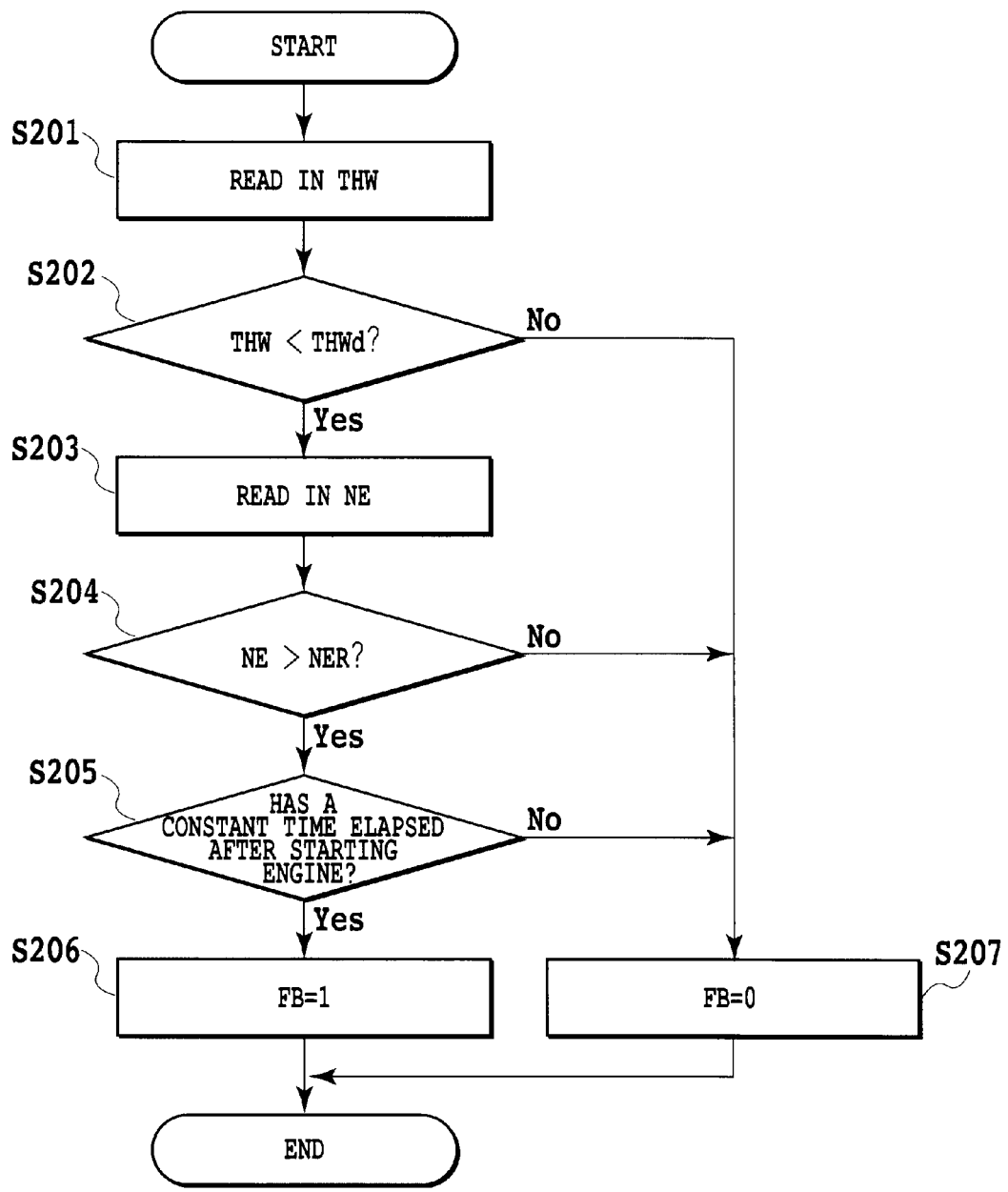
FIG. 2 is a flow chart showing an example of a routine setting a feedback start flag of an engine speed control by a speed feedback control by means of ignition timing in an embodiment of the present invention.

First, FIG. 2 is a routine for setting a feedback start flag of an engine speed control by a speed feedback control by means of ignition timing and the routine is executed every predetermined time (for example, every 10 ms). When the control is started, at step S201 a cooling water temperature THW from the water temperature sensor 40 is read in. In addition, at step 202 the cooling water temperature THW and a set water temperature THWd, that is a temperature at the time of completion of warming-up, are compared. When the cooling water temperature THW exceeds the set water temperature THWd, a temperature of the catalyst device 20 is not so much low and early warm-up of the catalyst device 20 is possible without particularly increasing an exhaust gas temperature. Therefore, it is required only to perform a general engine starting control for converging an engine speed to a target speed at idle by reduction of intake air and fuel, and the process goes to step S207, wherein the feedback start flag FB is set equal to 0, and the present routine ends.

On the other hand, when the cooling water temperature THW is less than the set water temperature THWd, the process goes to step S203, wherein an engine speed NE is read in and at step S204 the engine speed NE and the target speed NER are compared. Here, the target speed NER is a target value of a speed at which the engine can stably rotate under an idling condition. The target speed NER is set to a value in accordance with the cooling water temperature THW in such a manner as to be the higher as the cooling water temperature THW is the lower.

When the engine speed NE exceeds the target speed NER, the process goes to step S205, wherein, for example, it is determined whether or not a constant time elapses from the engine start. When the constant time elapses, the process goes to step S206, wherein the feedback start flag FB is set equal to 1. On the other hand, when the engine speed NE is equal to or less than the target speed NER, or even if the engine speed NE exceeds the target speed NER and before the constant time elapses from engine start, the process goes to step S207, wherein the feedback start flag FB is set equal to 0.

Figure 3:
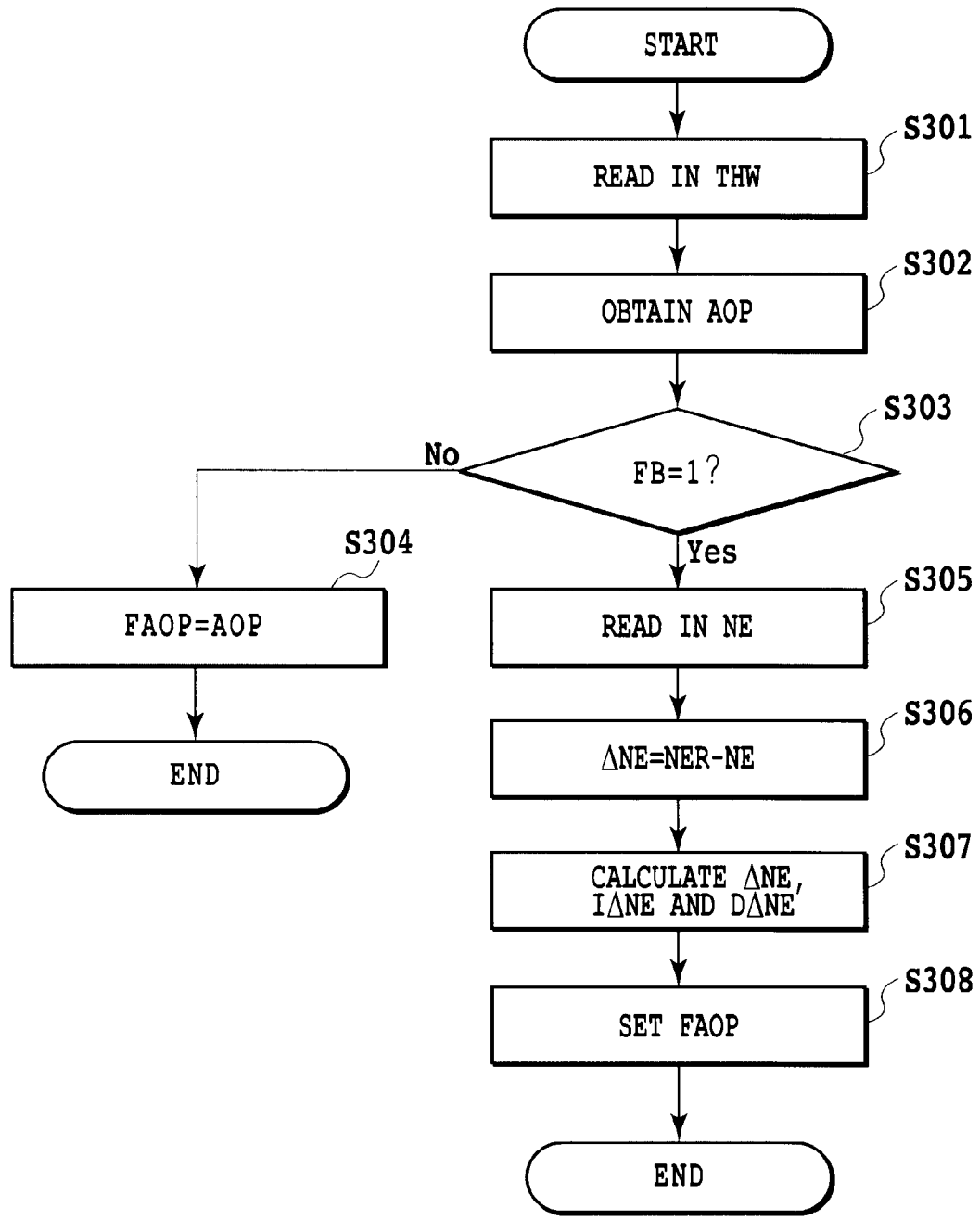
FIG. 3 is a flow chart showing an example of a setting routine of an ignition timing executed at speed feedback-controlling by means of ignition timing in the embodiment of the present invention.

Next, a routine for setting an ignition timing executed at speed feedback-controlling by means of ignition timing will be explained with reference to a flow chart in FIG. 3.

When the setting routine of this ignition timing starts, at step S301 the cooling water temperature THW from the water temperature sensor 40 is read in and a basic ignition timing AOP is found from a map stored in the ROM based upon a value of the cooling water temperature THW at step S302. A value of the basic ignition timing AOP is an ignition timing suitable for an engine condition before engine warm-up completion and the value is on the more advanced side as the cooling water temperature THW is the lower.

In addition, at the next step S303 it is determined whether the feedback start flag FB is "1" or "0". When the feedback start flag FB is equal to 0, the process goes to step S304, wherein the basic ignition timing AOP is set as a final ignition timing FAOP as it is.

When the feedback start flag FB is equal to 1, the process goes to step S305 and step S306 for performing the speed feedback control by means of ignition timing, wherein the engine speed NE is read in and a deviation $\Delta NE$ from the target speed NER is found by an equation of $\Delta NE$=target speed NER−engine speed NE.

In addition, at the next step S307, the deviation $\Delta NE$ between the target speed NER and the actual engine speed NE, an integral value $I\Delta NE$ of the deviation $\Delta NE$ and a differential value $D\Delta NE$ of the deviation $\Delta NE$ are calculated. In addition, the final ignition timing FAOP is, by using the deviations $\Delta NE$, $I\Delta NE$ and $D\Delta NE$, set as an equation of "$FAOP=AOP+\beta_1 \times \Delta NE+\beta_2 \Delta I\Delta NE+\beta_3 \times D\Delta NE-EACAT$".

That is, the final ignition timing FAOP is set as a quantity found by adding a catalyst warm-up retard quantity (−EACAT) to a sum of the basic ignition timing AOP depending on the engine cooling water temperature and the feedback correction quantity ($\beta_1 \times \Delta NE+\beta_2 \times I\Delta NE+\beta_3 \times D\Delta NE$). Further, at step S308 the final ignition timing AOP set as described above is set to an ignition circuit (not shown) and the present routine ends.

It should be noted that in the above equation, the ignition timing is expressed by a crank angle until a top dead center of each cylinder and as a value of the ignition timing increases, the ignition timing is advanced. In addition, $\beta_1$, $\beta_2$, and $\beta_3$ respectively are coefficients (feedback control constants) of a proportional term, an integral term and a differential term. Further, the EACAT is a catalyst warm-up retard quantity. The catalyst warm-up retard quantity EACAT is set to increase an exhaust gas temperature at engine starting so that an exhaust gas purifying catalyst reaches an activation temperature in a short time. The catalyst warm-up retard quantity EACAT changes such that it gradually increases after starting of the engine start control and thereafter, gradually reduces to reach a zero in a predetermined time after starting of the engine start control. For example, the catalyst warm-up retard quantity EACAT is set by multiplying a basic catalyst warm-up retard quantity in advance given as a function of an engine cooling water temperature by a reflection coefficient given as a function of an elapse time after starting of the engine start control.

This reflection coefficient is set to a zero for facilitating the engine start from a start point of the engine start control until an elapse point of a predetermined time and starts to increase when a few seconds elapse after starting of the engine start control. The reflection coefficient is set such that when the reflection coefficient increases to "1", thereafter it gradually starts to reduce and continues to reduce to a zero. Therefore, the catalyst warm-up retard quantity EACAT also changes in the same way as the reflection coefficient after starting of the engine start control. However, since the speed feedback control by means of ignition timing changes the engine ignition timing to make the speed equal to the target speed, when the catalyst warm-up retard quantity EACAT increases/decreases in the middle of performing the speed feedback control by means of ignition timing, an ignition timing adjustment for the speed feedback control interferes with the increase/decrease of the EACAT, creating the problem with the difficulty in converging the engine speed to the target speed for a short time.

Figure 4:
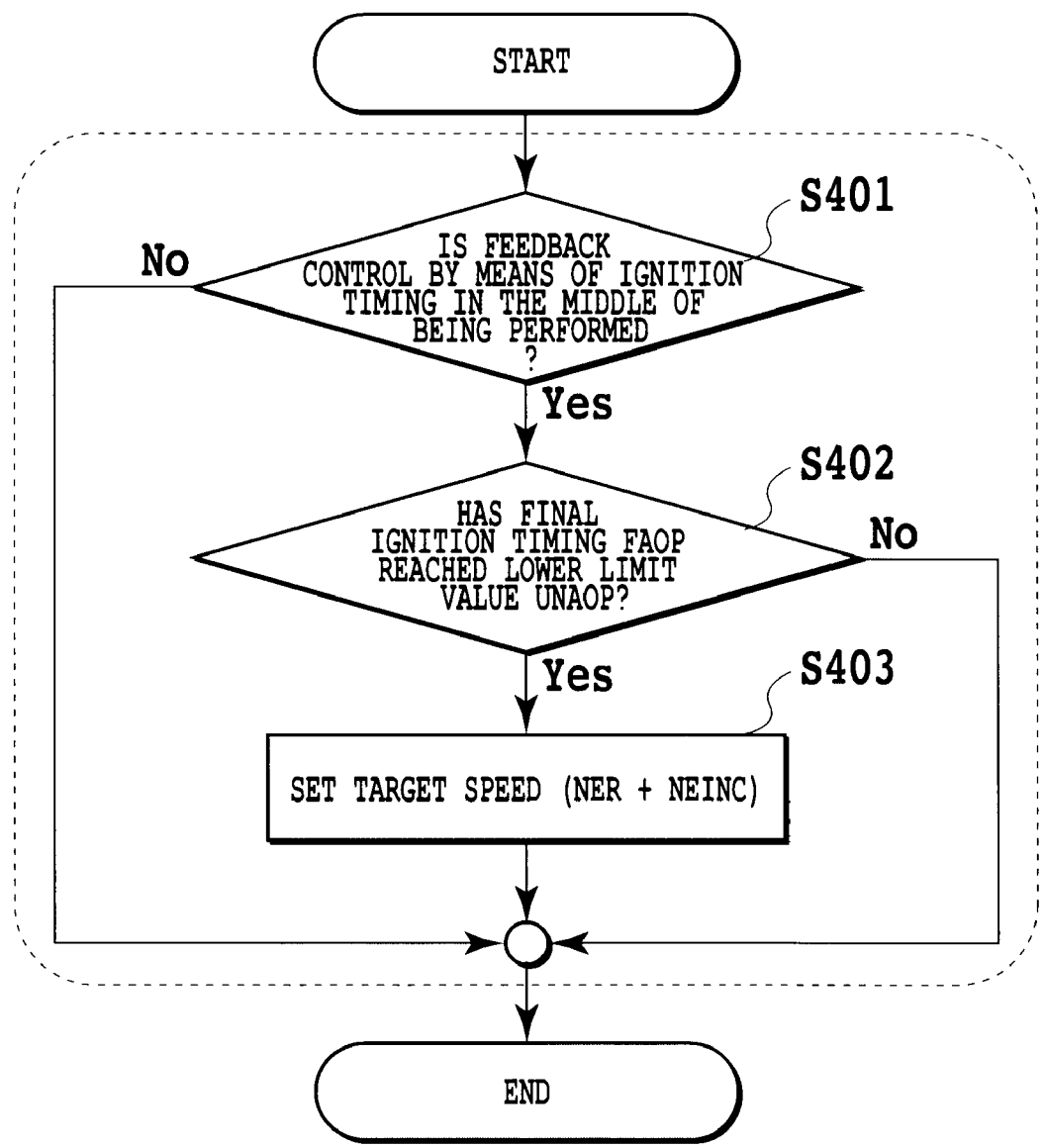
FIG. 4 is a flow chart showing an example of a routine changing a target speed in the embodiment of the present invention.

Therefore, the present embodiment performs control in accordance with a flow chart shown in FIG. 4. This control is performed at a predetermined timing as a sub routine of the aforementioned ignition timing setting routine. Accordingly, when the control starts, at step S401 it is determined whether or not the engine speed control by the engine speed feedback control by means of ignition timing is in the middle of being performed, in other words, it is determined whether the aforementioned feedback start flag FB is "1" or "0". When the feedback start flag FB is equal to 0, this routine ends. On the other hand, when the feedback start flag FB is equal to 1, the process goes to step S402, wherein the final ignition timing FAOP is compared with the retard lower limit value UNAOP to determine whether or not the final ignition timing FAOP has reached the retard lower limit value UNAOP. As a result of this comparison, when the final ignition timing FAOP does not reach the retard lower limit value UNAOP, this routine ends. On the other hand, when the final ignition timing FAOP reaches the retard lower limit value UNAOP, the process goes to step S403, wherein the target speed NER is increased by a predetermined speed. That is, a constant target speed changing quantity NEINC is added to the target speed NER. In addition, this new target speed (NER+NEINC) is used to find the deviation ΔNE from the actual engine speed NE. The final ignition timing FAOP is set based upon this deviation ΔNE as described above.

When the new target speed (NER+NEINC) is thus used, the ignition timing is advanced in response to the new target speed. Therefore, the final ignition timing FAOP is away from the retard lower limit value UNAOP and is back within a range of the speed feedback control by means of ignition timing. Accordingly, it is possible to perform the engine speed control by the speed feedback control by means of ignition timing to restrict the rotational variations. In addition, since an intake air quantity for obtaining necessary torque is secured by the increased new target speed, it is possible to maintain early warm-up characteristics of the catalyst device.

Figure 5:
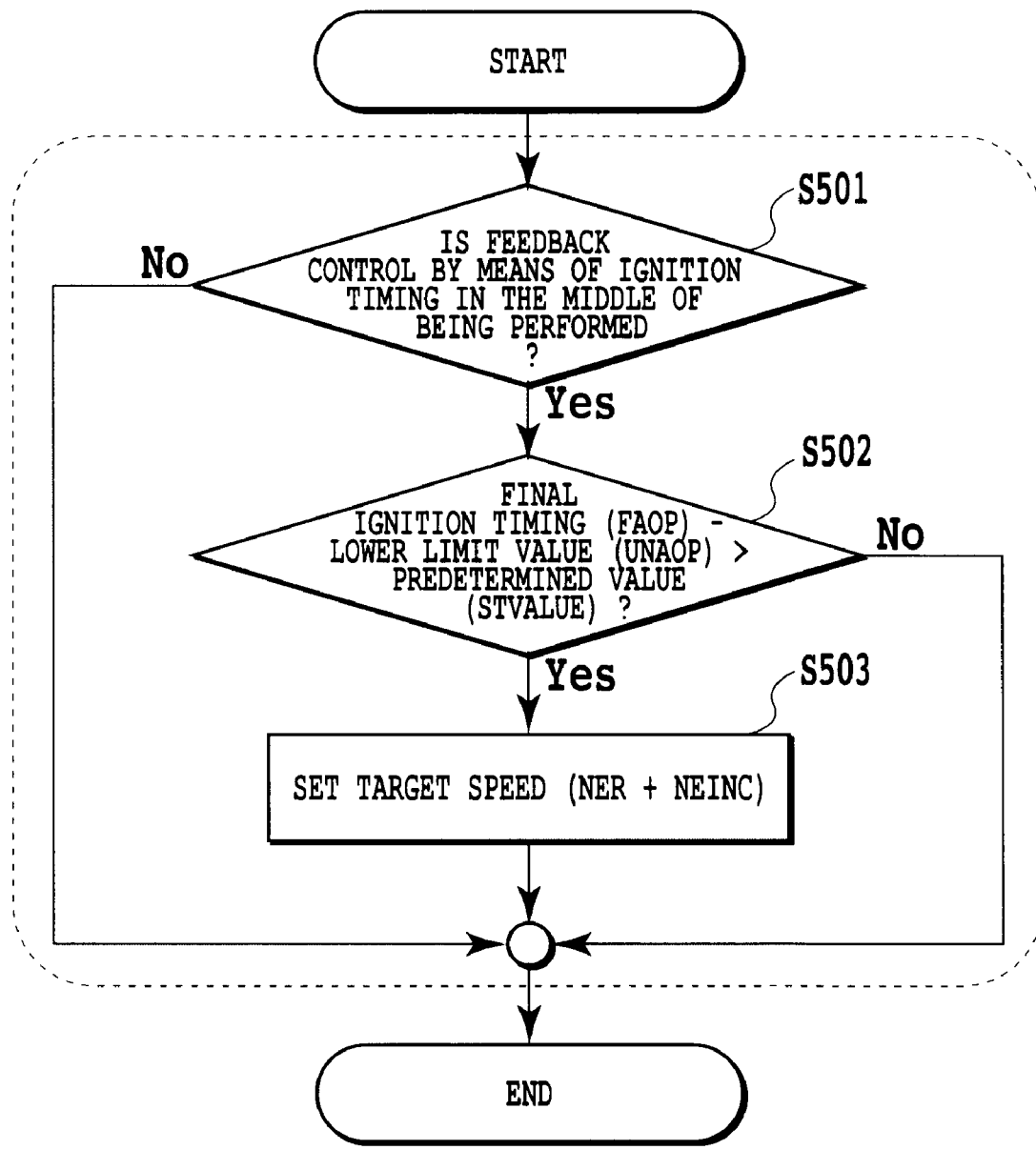
FIG. 5 is a flow chart showing another example of the routine changing the target speed in the embodiment of the present invention.

In addition, in the present embodiment, the control in accordance with the flow chart in FIG. 5 is performed subsequent to the control of the flow chart in FIG. 4 described above. When this control starts, at step S501 it is determined whether or not the engine speed control by the engine speed feedback control by means of ignition timing is in the middle of being performed in the same way as the control of the flow chart shown in FIG. 4, in other words, it is determined whether the aforementioned feedback start flag FB is "1" or "0". When the feedback start flag FB is equal to 0, this routine ends. On the other hand, when the feedback start flag FB is equal to 1, the process goes to step S502, wherein a difference (FAOP−UNAOP) between the final ignition timing FAOP and the retard lower limit value UNAOP is compared with a predetermined angle value STVALUE to determine whether or not this difference is larger than the predetermined angle value STVALUE. The predetermined angle value STVALUE is set as, for example, a value in such a manner that the ignition timing is in the vicinity of an upper limit value for the aforementioned catalyst warm-up. When the difference between the final ignition timing FAOP and the retard lower limit value UNAOP is smaller than the predetermined angle value STVALUE, in other words, when the final ignition timing FAOP is on a side more retarded from the above upper limit value, this routine ends. On the other hand, when the difference between the final ignition timing FAOP and the retard lower limit value UNAOP is larger than the predetermined angle value STVALUE, in other words, when the difference between the final ignition timing FAOP and the retard lower limit value UNAOP exceeds a predetermined angle on the advance side and the final ignition timing FAOP is on a side more advanced from the above upper limit value, the process goes to step S503, wherein the target speed NER is decreased by a predetermined speed. That is, the constant target speed changing quantity NEINC is subtracted from the target speed NER. In addition, this new target speed (NER−NEINC) is used to find the deviation ΔNE from the actual engine speed NE. The final ignition timing FAOP is set based upon this deviation ΔNE as described above.

When this new target speed (NER−NEINC) is thus used, the ignition timing is retarded in response to the new target speed and therefore, the final ignition timing FAOP is controlled to the more retarded side. Accordingly, it is possible to increase the exhaust gas temperature, thereby realizing the early warm-up of the catalyst device. In addition, also in a case of excessively increasing the target speed NER by the control of the flow chart shown in FIG. 4, the new target speed is used to correct the increased target speed NER.

Figure 6:
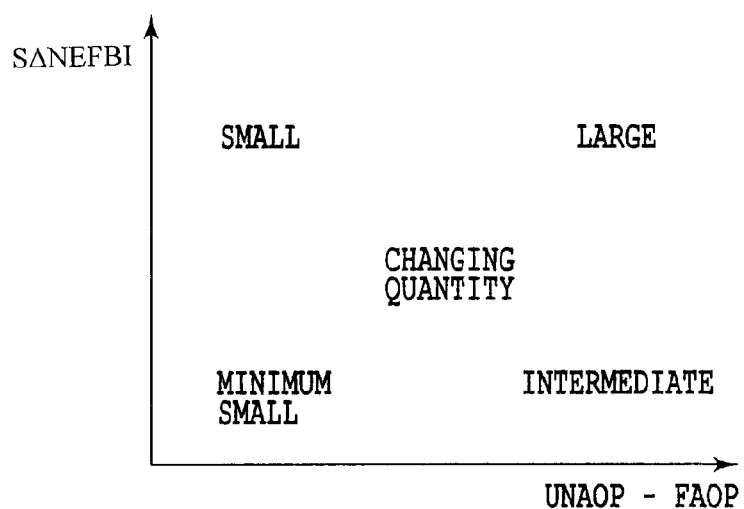
FIG. 6 is a graph showing a distribution example of a magnitude of a target speed changing quantity set in the embodiment of the present invention.

It should be noted that in the aforementioned embodiment, the target speed changing quantity NEINC is explained as a constant value, but a value of the target speed changing quantity NEINC may be changed based upon a magnitude of the aforementioned integral term ($\beta_2 \times I\Delta NE$) (hereinafter, referred to as SΔNEFBI) among the aforementioned feedback correction quantities and a magnitude of the difference (UNAOP−FAOP) between the retard lower limit value UNAOP and the final ignition timing FAOP as shown in FIG. 6. That is, when the difference between the retard lower limit value UNAOP and the final ignition timing FAOP is small and the integral term SΔNEFBI is in a small region, the target speed changing quantity NEINC is made to a minimum value. When the difference between the retard lower limit value UNAOP and the final ignition timing FAOP is small and the integral term SΔNEFBI is in a large region, the target speed changing quantity NEINC is made to a small value. When the difference between the retard lower limit value UNAOP and the final ignition timing FAOP is large and the integral term SΔNEFBI is in a small region, the target speed changing quantity NEINC is made to an intermediate value. When the difference between the retard lower limit value UNAOP and the final ignition timing FAOP is large and the integral term SΔNEFBI is in a large region, the target speed changing quantity NEINC is made to a large value. In this way, it is prevented that the target speed is rapidly and excessively changed, making it possible to restrict the rotational variations.

Next, another embodiment of the present invention will be explained with reference to a flow chart in FIG. 7. The previous embodiment is designed so that the speed feedback control by means of ignition timing is performed by increasing/decreasing the constant target speed changing quantity NEINC with respect to the target speed NER, but the present embodiment is designed so that the target speed changing quantity NEINC is set to a deviation amount between the target speed NER and the present speed NE in a given case, thereby increasing response characteristics of the control.

Figure 7:
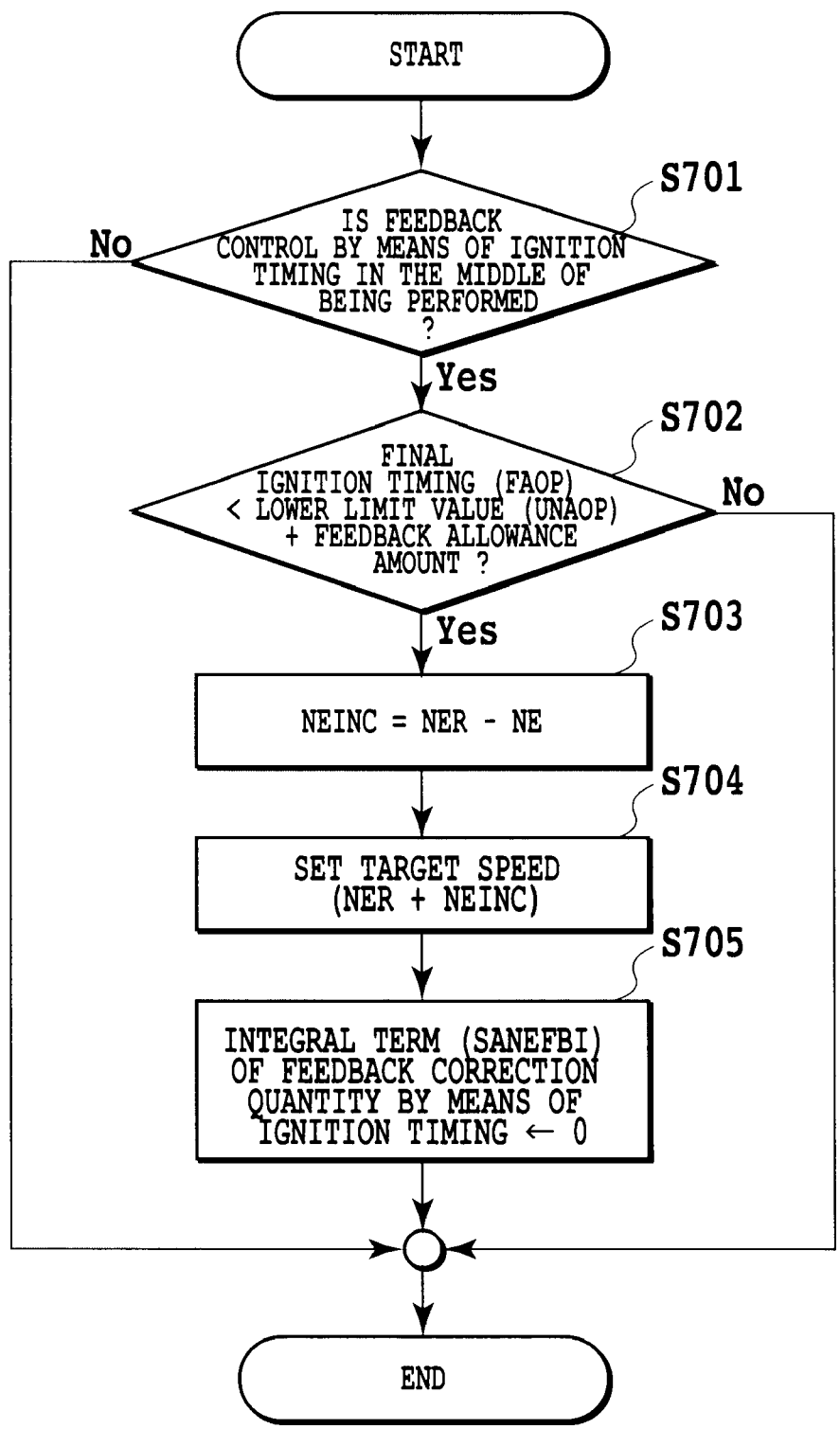
FIG. 7 is a flow chart showing an example of a routine changing a target speed in another embodiment of the present invention.

Therefore, in the control of the flow chart shown in FIG. 7 performed in a predetermined period, when this control starts, at step S701 it is determined whether or not the engine speed control by the engine speed feedback control by means of ignition timing is in the middle of being performed, in other words, it is determined whether the aforementioned feedback start flag FB is "1" or "0". When the feedback start flag FB is equal to 0, this routine ends. On the other hand, the feedback start flag FB is equal to 1, the process goes to step S702, wherein it is determined whether or not the final ignition timing FAOP has reached a timing having a predetermined speed feedback control allowance amount by means of ignition timing in relation to the retard lower limit value UNAOP, in other words, whether or not a difference between the final ignition timing FAOP and the retard lower limit value UNAOP is smaller than the predetermined speed feedback control allowance amount by means of ignition timing. When the final ignition timing FAOP does not reach the timing having the predetermined speed feedback control allowance amount, this routine ends. It should be noted that the speed feedback control allowance amount by means of ignition timing means an angle amount in which an engine speed is controllable by retarding the ignition timing.

On the other hand, when the final ignition timing FAOP has reached the timing having the predetermined speed feedback control allowance amount by means of ignition timing in relation to the retard lower limit value UNAOP, the process goes to step S703, wherein the target speed changing quantity NEINC is set as the difference (NER−NE) between the target speed NER and the present speed NE. At the next step S704, this set target speed changing quantity NEINC is added to the target speed NER. Further, at step S705 the integral term SΔNEFBI ($=\beta_2 \times I\Delta NE$) among the feedback correction quantities in the speed feedback control by means of ignition timing is made to 0. This setting is executed by making the coefficient $\beta_2$ equal to 0.

It should be noted that the new target speed (NER+NEINC) thus changed is used to find a deviation ΔNE from an actual engine speed NE. The final ignition timing FAOP is set based upon this deviation ΔNE as described above, but at this time, the integral term SΔNEFBI among the feedback correction quantities is made to 0. This is because of performing the feedback control following up without a steady deviation.

In this way, according to the other embodiment, the engine speed quickly converges to the target speed in response.

What is claimed is:

1. A control device for an internal combustion engine which, at cold starting, enables an ignition timing retard control for warm-up of a catalyst device and a speed feedback control by means of ignition timing for converging an engine speed to a target speed, the control device comprising:
   means for comparing a final ignition timing with a retard lower limit value while performing said speed feedback control by means of ignition timing; and
   means for changing the target speed in said speed feedback control by means of ignition timing based upon a result of the comparing by said comparing means,
   wherein when a difference between a final ignition timing and the retard lower limit value exceeds a predetermined angle on an advance side as determined by the result of the comparing by said comparing means, the target speed changing means decreases the target speed by a first predetermined speed.

2. The control device for the internal combustion engine of claim 1, wherein when the final ignition timing reaches the retard lower limit value as determined by the result of the comparing by said comparing means, the target speed changing means increases the target speed by a second predetermined speed.

3. The control device for the internal combustion engine of claim 1 or 2, wherein a point where the difference between said final ignition timing and the retard lower limit value exceeds the predetermined angle on the advance side is when the difference exceeds a first value equal to or more than the predetermined angle on the advance side, the first value approximating a retard upper limit value for catalyst warm-up.

4. The control device for the internal combustion engine of claim 1 or 2, wherein a changing quantity of the target speed by said target speed changing means is set in accordance with a magnitude in the difference between the final ignition timing and the retard lower limit value as determined by the result of the comparing by said comparing means and a magnitude of a feedback integral quantity in said speed feedback control by means of ignition timing for preventing excessive correction.

5. The control device for the internal combustion engine of claim 1, wherein when the final ignition timing has not reached the retard lower limit value as determined by the result of the comparing by said comparing means, the speed feedback control by means of ignition timing is terminated.

* * * * *